United States Patent [19]
Howell

[11] 3,801,955
[45] Apr. 2, 1974

[54] CYCLIC CODE ENCODER/DECODER

[75] Inventor: Thomas Harold Howell, Scottsdale, Ariz.

[73] Assignee: Honeywell Information Systems Inc., Waltham, Mass.

[22] Filed: Dec. 13, 1971

[21] Appl. No.: 207,209

[52] U.S. Cl. .............. 340/146.1 AL, 340/146.1 AV
[51] Int. Cl. ............................................. G06f 11/12
[58] Field of Search .......... 340/146.1 AL, 146.1 AV

[56] References Cited

UNITED STATES PATENTS

| | | | |
|---|---|---|---|
| 3,159,810 | 12/1964 | Fire | 340/146.1 AL |
| 3,512,150 | 5/1970 | Ohnsorge | 340/146.1 AL |
| 3,582,881 | 6/1971 | Burton | 340/146.1 AL |

*Primary Examiner*—Charles E. Atkinson
*Attorney, Agent, or Firm*—Edward W. Hughes and W. W. Nielsen

[57] ABSTRACT

A cyclic code decoder is provided which has a feedback shift register organized in two sections which together form a cyclic code encoder. The first section has a gated feedback connection in accordance with the polynomial $x^c + 1$. The second section is selectively connected in series with the first section and has gated feedback connections for the polynomial $P_1(x)$. Additional feedback connections are provided for the first section, in accordance with the polynomial $P_1(x)$ and these feedback connections are selectively connected in series with the feedback to the second section of the shift register. A zero detector, comparator and counter are provided for error detection and identification as a factored polynomial.

5 Claims, 5 Drawing Figures

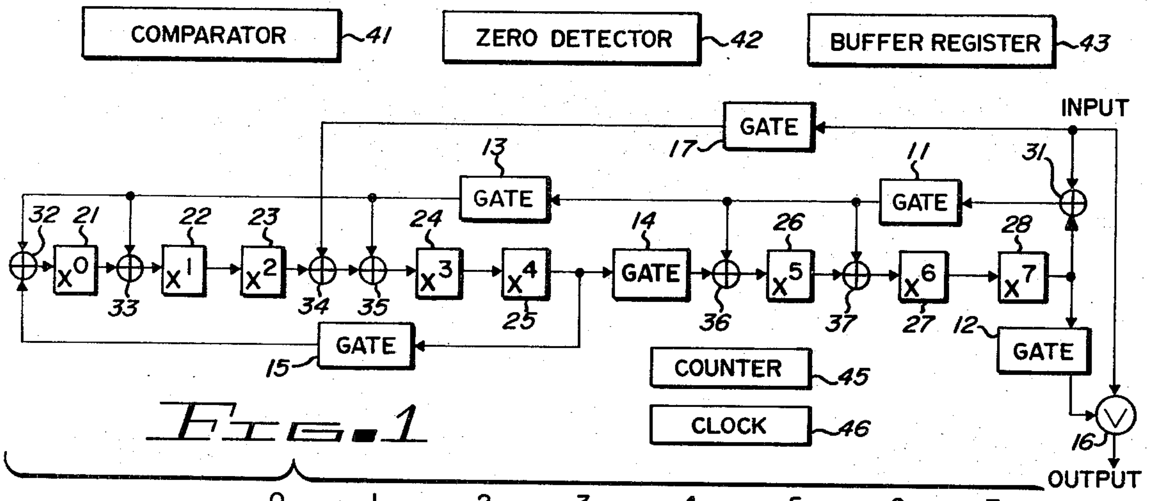
FIG. 1
| INPUT (G(x)) | $x^0$ | $x^1$ | $x^2$ | $x^3$ | $x^4$ | $x^5$ | $x^6$ | $x^7$ |
|---|---|---|---|---|---|---|---|---|
| INITIALLY | 0 | 0 | 0 | 0 | 0 | 0 | 0 | 0 |
| | REGISTER CONTENTS | | | | | | | |
| 1 | 1 | 1 | 0 | 1 | 0 | 1 | 1 | 0 |
| 0 | 0 | 1 | 1 | 0 | 1 | 0 | 1 | 1 |
| 0 | 1 | 1 | 1 | 0 | 0 | 0 | 1 | 1 |
| 0 | 1 | 0 | 1 | 0 | 0 | 1 | 1 | 1 |
| 0 | 1 | 0 | 0 | 0 | 0 | 1 | 0 | 1 |
| 0 | 1 | 0 | 0 | 1 | 0 | 1 | 0 | 0 |
| 0 | 0 | 1 | 0 | 0 | 1 | 0 | 1 | 0 |
| 1 | 1 | 1 | 1 | 1 | 0 | 0 | 1 | 1 |
| 1 | 0 | 1 | 1 | 1 | 1 | 0 | 0 | 1 |
| 0 | 1 | 1 | 1 | 0 | 1 | 0 | 1 | 0 |
| 0 | 0 | 1 | 1 | 1 | 0 | 1 | 0 | 1 |
| 0 | 1 | 1 | 1 | 0 | 1 | 1 | 0 | 0 |
| 0 | 0 | 1 | 1 | 1 | 0 | 1 | 1 | 0 |
| 0 | 0 | 0 | 1 | 1 | 1 | 0 | 1 | 1 |
| 0 | 1 | 1 | 0 | 0 | 1 | 0 | 1 | 1 |
| 0 | 1 | 0 | 1 | 1 | 0 | 0 | 1 | 1 |
| 0 | 1 | 0 | 1 | 0 | 1 | 1 | 1 | 1 |
| 1 | 0 | 1 | 0 | 0 | 0 | 1 | 1 | 1 |
| 0 | 1 | 1 | 1 | 1 | 0 | 1 | 0 | 1 |
| 0 | 1 | 0 | 1 | 0 | 1 | 1 | 0 | 0 |
| 0 | 0 | 1 | 0 | 1 | 0 | 1 | 1 | 0 |
| 0 | 0 | 0 | 1 | 0 | 1 | 0 | 1 | 1 |
| 0 | 1 | 1 | 0 | 0 | 0 | 0 | 1 | 1 |
| 0 | 1 | 0 | 1 | 1 | 0 | 1 | 1 | 1 |
| 0 | 1 | 1 | 0 | 0 | 1 | 1 | 0 | 1 |
| 0 | 1 | 0 | 0 | 1 | 0 | 0 | 0 | 0 |
| 1 | 1 | 0 | 0 | 1 | 1 | 1 | 1 | 0 |
R(x)
OUTPUT $R(x) = x^6 + x^5 + x^4 + x^3 + 1$
FIG. 3
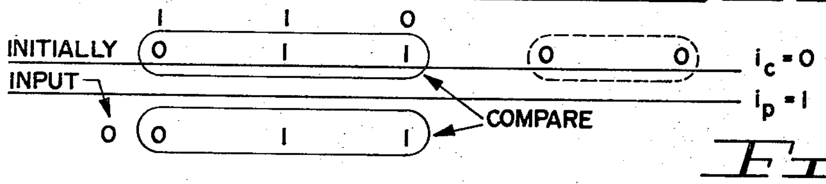
FIG. 5

| INPUT H(x) | REGISTER CONTENTS | | | | |
|---|---|---|---|---|---|
| INITIALLY | 0 | 0 | 0 | | |
| | 0 | 0 | 0 | 0 | 0 |
| 1 | 1 | 1 | 0 | | |
| | 0 | 0 | 0 | 1 | 0 |
| 0 | 0 | 1 | 1 | | |
| | 0 | 0 | 0 | 0 | 1 |
| 0 | 1 | 1 | 1 | | |
| | 1 | 0 | 0 | 0 | 0 |
| 0 | 1 | 0 | 1 | | |
| | 0 | 1 | 0 | 0 | 0 |
| 0 | 1 | 0 | 0 | | |
| | 0 | 0 | 1 | 0 | 0 |
| 0 | 0 | 1 | 0 | | |
| | 0 | 0 | 0 | 1 | 0 |
| 0 | 0 | 0 | 1 | | |
| | 0 | 0 | 0 | 0 | 0 |
| 1 | 0 | 0 | 0 | | |
| | 1 | 0 | 0 | 1 | 0 |
| 1 | 1 | 1 | 0 | | |
| | 0 | 1 | 0 | 1 | 1 |
| 0 | 0 | 1 | 1 | | |
| | 1 | 0 | 1 | 0 | 1 |
| 0 | 1 | 1 | 1 | | |
| | 1 | 1 | 0 | 1 | 0 |
| 0 | 1 | 0 | 1 | | |
| | 0 | 1 | 1 | 0 | 1 |
| 0 | 1 | 0 | 0 | | |
| | 1 | 0 | 1 | 1 | 0 |
| 0 | 0 | 1 | 0 | | |
| | 0 | 1 | 0 | 1 | 1 |
| 0 | 0 | 0 | 1 | | |
| | 1 | 0 | 1 | 0 | 1 |
| *1 | 0 | 0 | 0 | | |
| | 1 | 1 | 0 | 0 | 0 |

| INPUT H(x) | REGISTER CONTENTS | | | | |
|---|---|---|---|---|---|
| *1 | 1 | 1 | 0 | | |
| | 0 | 1 | 1 | 1 | 0 |
| 1 | 1 | 0 | 1 | | |
| | 0 | 0 | 1 | 0 | 1 |
| 0 | 1 | 0 | 0 | | |
| | 1 | 0 | 0 | 1 | 0 |
| 0 | 0 | 1 | 0 | | |
| | 0 | 1 | 0 | 0 | 1 |
| 0 | 0 | 0 | 1 | | |
| | 1 | 0 | 1 | 0 | 0 |
| 0 | 1 | 1 | 0 | | |
| | 0 | 1 | 0 | 1 | 0 |
| 0 | 0 | 1 | 1 | | |
| | 0 | 0 | 1 | 0 | 1 |
| 0 | 1 | 1 | 1 | | |
| | 1 | 0 | 0 | 1 | 0 |
| 0 | 1 | 0 | 1 | | |
| | 0 | 1 | 0 | 0 | 1 |
| 0 | 1 | 0 | 0 | | |
| | 1 | 0 | 1 | 0 | 0 |
| 1 | 1 | 0 | 0 | 0 | |
| | 0 | 1 | 0 | 0 | 0 |
| 0 | 0 | 1 | 0 | | |
| | 0 | 0 | 1 | 0 | 0 |
| 1 | 1 | 1 | 1 | | |
| | 0 | 0 | 0 | 0 | 0 |
| 1 | 0 | 1 | 1 | | |
| | 0 | 0 | 0 | 1 | 0 |
| 1 | 0 | 0 | 1 | | |
| | 0 | 0 | 0 | 1 | 0 |
| 1 | 0 | 0 | 0 | | |
| | 1 | 0 | 0 | 1 | 1 |
| 0 | 0 | 0 | 0 | | |
| | 1 | 1 | 0 | 0 | 1 |
| 0 | 0 | 0 | 0 | | |
| | 1 | 1 | 1 | 0 | 0 |
| 1 | 1 | 1 | 0 | | |
| | 0 | 1 | 1 | 0 | 0 |

SYNDROME: $S_p = x+1$, $S_c = x^2+x$

CYCLIC CODE ENCODER/DECODER

FIELD OF THE INVENTION

This invention relates to the field of error correction and detection. In particular, it is concerned with faster error identification with the encoding and decoding of binary information, using cyclic codes.

DESCRIPTION OF THE PRIOR ART

Cyclic codes have been available as a powerful tool for error detection and correction in the transfer and storage of binary data. Encoding and decoding can be performed with either serial or parallel logic. Because the data transfers of interest have more often been of a serial nature, because feedback shift register implementation is economical, and because substantially the same serial hardware can be used for encoding and decoding, feedback shift register implementation has been of primary interest. Particularly where burst errors have been a major concern, Fire codes, defined by a polynomial of the form, $P(x) = P_1(x)\ (x^c + l)$ have been important. (The operator "+" is used to represent modulo 2 addition operation, which is equivalent to the exclusive OR operation, throughout this specification, unless otherwise indicated.) Fire codes are normally defined as requiring the polynomial factor $P_1(x)$ to be irreducible. For the purpose of this disclosure, cyclic codes, in general, include those codes where $P_1(x)$ is reducible.

However, with a code word length of $n$ bits, $k$ information bits, $n-k = r$ check bits, error correction has normally required n operation cycles. This is because of the standard procedure of buffering a decoded message and if an all zeros syndrome (no error detected condition) is not detected in the decoder shift register upon receipt of the encoded data, the buffered word is circulated and the shift register is serially shifted with feedback until a correctable error pattern is located. To impose upon a system the requirement that this error correction time be available, between code word transmissions, is a significant constraint.

It has been observed, by W. W. Peterson, "Error-correcting Codes", M.I.T. Press, 1961, Chapter 10 for example, that the code polynomial factors can be implemented by respective shift regiser portions. For an encoded word, $F(x)$, $F(x)/P_1(x) = 0$ and $F(x)/(x^c = 1) = 0$ is equivalent to $F(x)/P(x) = 0$. Therefore, a faster error detector can be implemented with simpler hardware. Of greatest importance, is the advantage that when an error is detected, the time required for error identification can be substantially reduced, if desired. If the received code word is stored in a buffer shift register, and a feedback shift register implementing the polynomial $P(x)$ is run in an error pattern identification mode, the number of shift cycles required for error identification is greatly reduced. The factor of improvement is approximately $(e + c - 2)/n$, where e is the value of the exponent to which $P_1(x)$ belongs, e.g., the smallest positive integer such that $x^e + l$ is evenly divided by $P(x)$. The advantages of the factored decoder described by Peterson are discussed in greater detail in the IEEE Transactions on Information Theory, January, 1969, pages 109–113, by R. T. Chien.

However, such a decoder cannot be used for encoding and accordingly the commonality feature inherent in the conventional polynomial implementation is lost. Also, the capability of using the same hardware for encoding and decoding at a common site is lost. For example, in a disk peripheral subsystem for a computer, it is obviously desirable to have common hardware for both the encoding and decoding of code words. Accordingly, the object of the invention is to provide an encoder/decoder which has the advantages of the factored decoder and performs the necessary encoder functions.

SUMMARY OF THE INVENTION

It has been discovered that for encoding and decoding devices using cyclic code error correction, it is possible to use substantially the same feedback shift register structure for both encoding the check bits, $R(x)$, and for identifying counts $i_p$ and $i_c$ indicative of an error location, together with the burst error pattern. This error identification time is approximately $(e + c - 2)/n$ of the conventional error identification time.

BRIEF DESCRIPTION OF THE DRAWINGS

FIG. 1 is a block diagram of an encoder/decoder primarily showing the feedback connections for encoding for a representative generating polynomial.

FIG. 2 is a block diagram of the FIG. 1 encoder/decoder primarily showing the connections required for decoding.

FIGS. 3–5 are diagrams illustrating operation of the encoder/decoder.

DETAILED DESCRIPTION OF THE INVENTION

Figures 2, 4:
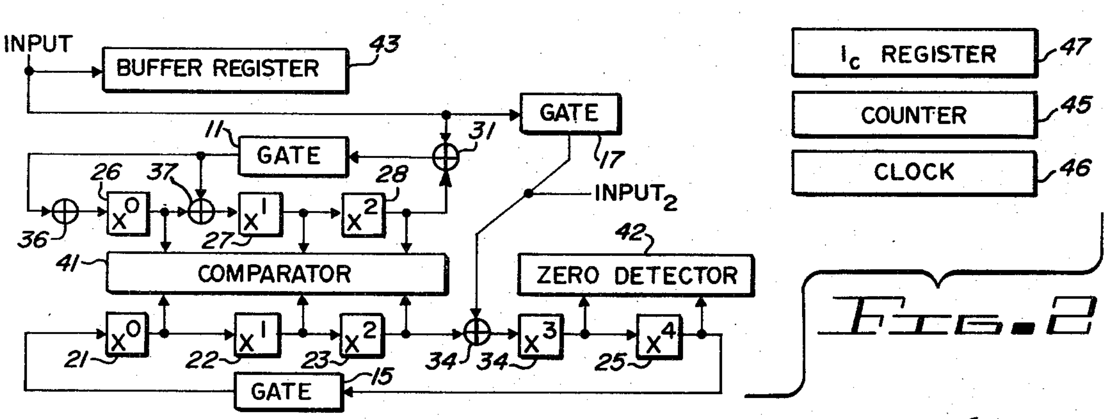

FIG. 1 is a serial Fire code decoder/encoder using a feedback shift register for the code polynomial:

$$P(x) = P_1(x)\ (x^c + 1) = (x^3 + x + 1)\ (x^5 + 1)$$
$$= x^8 + x^6 + x^5 + x^3 + x + 1.$$

Flip-flops 21-28 provide shift register positions and interconnections to mod 2 adder gates 31–33 and 35–37 provide the desired feedback for the polynomial $P(x)$ in the usual manner. Gate 11, when enabled, permits the generation of the $n-k$ remainder check bits, $R(x)$, by the feedback shift register during transmission, while the $k$ information bits also pass through OR gate 16. Gate 12, inhibited during the generation of $R(x)$, is then enabled and $R(x)$ is transmitted through OR gate 16 with the input held at a logical zero. Gate 14, between shift register position 25 and mod 2 gate 36, divides the feedback shift register so that there is effectively a separable section including register positions 26–28. Gate 14 is enabled during encoding and therefore has no effect on transmission. Similarly, gate 13 partitions the feedback path. Accordingly, gates 13 and 14 are enabled and gates 15 and 17 are inhibited during transmission and therefore have no effect on encoding. With gate 13 placed in the feedback path so that together with gate 14, the feedback shift register can be partitioned, whereby the high order section can be transformed into a decoder for the polynomial $P_1(x) = x^3 + x + 1$. Gate 15 is connected between register position 25 and mod 2 gate 32, providing a feedback path for decoding by $(x^5 + 1)$. Gate 17 selectively connects the input to a mod 2 gate 34, between register position 23 and mod 2 gate 35, so that the input can be selectively applied to the low order section of the feedback shift register during decoding. A comparator 41, zero detector 42, and buffer shift register 43 are provided for decoding. The connections for these elements are shown in FIG. 2. Gates 13 and 14, are not shown in FIG. 2 because these gates are inhibited during error detection and identification. A counter 45, driven by encoder/decoder clock source 46, is required for fast error identification.

During decoding, gates 11, 15, and 17 are enabled so the code word is applied to upper and lower sections of the feedback shift in parallel. The higher order section serves to divide the received word by the polynomial $P_1(x) = x^3 + x + 1$ and the low order section serves to divide by the polynomial $x^5 + 1$. After the received word is checked, if the contents of all the register positions are zero, this composite syndrome indicates that no error was detected. For checking, comparator 14 serves as a zero detector. This zero result in conjunction with a zero detection at zero detector 42 terminates decoding. If the composite error syndrome is non-zero, the error identification procedure is followed. This procedure consists of providing a series of zero inputs to the low order register section via INPUT 2. That is, with gate 15 enabled, the clock shifts the low order section. When the zero detector 42 detects all zeros in register positions 24 and 25, this count is sotred in $I_c$ register 47 from counter 45. The counter 45 is then cleared and a series of zeros is applied to the high order register section. The series of zeros is then continued until register position 21–23 compare exactly with the contents of the corresponding register positions 26–28, respectively. The contents of counter 45 is then $i_p$, which together with $i_c$ determines the location of the error in the code word. Also, the burst error pattern is now stored in the high order section of the feedback shift register.

The location $i$ of the error pattern is determined by the relationship:

$i = (ej_c[(n-m-i_c) \bmod c] + cj_p[(n-m-i_p) \bmod e]) \bmod n$ where $j_c$ and $j_p$ are integers such that:

$ej_c + cj_p = 1 \bmod n$ where $m$ is the maximum correctable burst length.

For the FIG. 2 decoder, these relationships require:

$i = (7j_c[(32 - i_c) \bmod 5] + 5j_p[(32 - i_p) \bmod 7]) \bmod 35$ and $7e_j + {}_5e_p = 1 \bmod 35$.

For example, with the composite error syndrome 110 and 01100, $i_c = 0$ and $i_p = 1$. Also, $e_j = 3 = e_p$ satisfies the constraint on $e_j$ and $e_p$. Therefore, $$i = (7(3)[(32-0) \bmod 5] + 5(3)[(32-1) \bmod 7]) \bmod 35$$
$$= (7(3)[2] + 5(3)[3]) \bmod 35 - (42 + 45) \bmod 35 = 17$$

The error pattern is accordingly:

$E(x) = x^i B(x) = x^{17}(x^2 + x) = x^{19} + x^{18}$.

FIG. 3 is a diagram illustrating the encoding operation of the FIG. 1 encoder/decoder operating as a conventional encoder with gate 11 enabled and gate 12 inhibited. As the information word, $G(x) = x^{26} + x^{19} + x^{18} + x^9 + 1$ is serially transmitted through OR gate 16, the remainder check bits are formed, $R(x) = x^6 + x^5 + x^4 + x^3 + 1$. After, $G(x)$ is transmitted, gate 11 is inhibited and gate 12 is enabled. $R(x)$ is then transmitted so that the coded word is $$F(x) = x^8 G(x) + R(x)$$
$$= x^{34} + x^{27} + x^{26} + x^{17} + x^8 + x^6 + x^5 + x^4 + x^3 + 1.$$

FIG. 4 is a diagram illustrating the operation of the FIG. 1 encoder/decoder operating in the FIG. 2 configuration. Gates 11, 15 and 17 are enabled; and gates 12, 13 and 14 are inhibited. The received word has the form $H(x) = F(x) + E(x)$, where $E(x)$ is an error, $x^{19} + x^{18}$. The resulting syndrome is 01100110 in register positions 21–28, respectively. Since these are not all zeros, the error has been detected. If a series of zeros are then provided as an input, the error can be determined as illustrated in FIG. 5. If the buffer register 43 was shifted out at the same time, the received word could be corrected by adding the error pattern, mod 2, to the respective bits in the received word. This requires $n = 35$ cycles, during which the device is unavailable for encoding or decoding. In general, it is necessary to provide a counter so that the correction operation will be terminated after $n$ cycles. When an uncorrectable error pattern is received, the comparator 41 and zero detector never achieve the desired zero conditions.

In applications such as computer peripheral subsystems, conventional error correction is obviously undesirable because of the time required and the dedication of a buffer register for the error correction function is a significant cost. If the buffer register function is provided by other hardware, such as a shared read/write memory, there is additional complexity in the data transfer and control logic.

When code words of much greater length are considered, these disadvantages become more evident. For example, with a Fire code polynomial, such $P(x) = (x^{11} + x^2 + 1)(x^{68} + 1)$, serious problems are encountered. In using the invention, the primary present interest is in long code words as is common in computer records. For example, with the last polynomial, code words up to 138,196 bits in length can be used, of which 79 bits are check bits. Such a code can correct burst errors up to 11 bits in length and clearly has very high efficiency. It is apparent that dedication of storage means to error correction buffer store is extremely costly. Accordingly, only one or two bytes should be buffered and then transferred to main memory. Where an error is detected, the error identification procedure is then performed and the data, $i_c$, $i_p$ and the error pattern, are transferred to the computer where the error is corrected.

It is understood that the above-described encoder/decoder is only illustrative of the application of the principles of the invention. Numerous modifications and alternative arrangements can be devised by those skilled in the art. In particular, the invention is applicable to any feedback shift register encoder/decoder for any Fire code, provided $c$ is greater than $m$.

What is claimed is:

1. An encoder/decoder for error detection and correction of code words consisting of $n$ signal bits and $k$ information bits, in which the encoding polynomial $P(x)$ can be represented in the factored form $P_1(x)(x^3 + 1)$ and the degree $m$ of polynomial $P_1(x)$ is less than $c$ comprising:

A. a feedback shift register having feedback connections realizing the Fire code polynomial $P(x)$;

B. gating means connecting portions of said shift register for selectively i. partitioning said register between the $x^{c-1}$ and $x^c$ positions, ii. disconnecting the feedback path beyond the $x^c$ position of said register, iii. connecting the output of the $x^{c-1}$ position to the input of the $x^0$ position of said register.

2. An encoder/decoder for error detection and correction of code words consisting of $n$ signal bits and $k$ information bits, in which the encoding polynomial $P(x)$ can be represented in the factored form $P_1(x)$ $(x^c + 1)$ and the degree m of polynomial $P_1(x)$ is less than $c$ comprising:

A. a low order feedback shift register section having encoding feedback connections which realize the polynomial $P_1(x)$;

B. decoding feedback connections, connected to said low order register section realizing the polynomial $x^c + 1$;

C. a high order feedback shift register section, connected in series with said low order section, having feedback connections with realize the polynomial $x^c P_1(x)$;

D. encoder gating means interconnecting said register sections in such a manner as to enable the encoder/decoder to encode $k$ information bit signals in accordance with $P(x)$;

E. decoder gating means interconnecting said first and second register sections for selective parallel decoding;

F. error detecting means, responsive to each stage of said shift register sections for detecting a zero state in all positions of said register sections.

3. The encoder/decoder of claim 2 further comprising:

G. said error detecting means including comparator means between said high order register section and the respective first m positions of said low order register section;

H. error identification means, clocked in parallel with said shift register sections, for counting the number of shifts of said low order section to produce an all zeros syndrome in the $c—m$ highest order positions of said register and for subsequently counting the number of shifts of said high order section to produce an equals comparison for the first m positions.

4. The encoder/decoder of claim 2 further comprising:

G. a zero detector, connected to every position of said shift register sections, for detecting a zero syndrome upon completion of decoding a code word;

H. a counter, clocked in parallel with said shift register sections;

I. a register, responsive to said counter, for storing the count required to shift an all zeros combination into the c-m most significant positions of said shift register.

5. An encoder/decoder comprising:

A. a first feedback shift register realizing the polynomial $P_1(x)$, having degree m:

B. a second feedback shift register realizing the polynomial $x^c + 1$, where c is an integer greater than $m$;

C. first gating means for disconnecting the feedback of said second shift register;

D. second gating means for connecting the feedback of said first feedback register to said second feedback register in accordance with the polynomial $P_1(x)$ $(x^c + 1)$ and for connecting the output of the high order position of said second shift register to the low order position of said first shift register;

E. detection means for detecting an all zeros syndrome in said shift registers and for comparing the first m positions of said shift registers.

* * * * *